US011921863B2

(12) United States Patent
Tamboli et al.

(10) Patent No.: US 11,921,863 B2
(45) Date of Patent: Mar. 5, 2024

(54) DETERMINING A SOURCE OF A VULNERABILITY IN SOFTWARE

(71) Applicant: Capital One Services, LLC, McLean, VA (US)

(72) Inventors: Jay Goodman Tamboli, Silver Spring, MD (US); Dustin Summers, Lovettsville, VA (US); Rui Zhang, New York, NY (US)

(73) Assignee: Capital One Services, LLC, McLean, VA (US)

( * ) Notice: Subject to any disclaimer, the term of this patent is extended or adjusted under 35 U.S.C. 154(b) by 192 days.

(21) Appl. No.: 17/541,945

(22) Filed: Dec. 3, 2021

(65) Prior Publication Data

US 2023/0177164 A1 Jun. 8, 2023

(51) Int. Cl.
*G06F 21/57* (2013.01)
*G06F 11/36* (2006.01)
*G06F 21/62* (2013.01)

(52) U.S. Cl.
CPC .......... *G06F 21/577* (2013.01); *G06F 11/362* (2013.01); *G06F 21/6245* (2013.01)

(58) Field of Classification Search
CPC .. G06F 21/577; G06F 11/362; G06F 21/6245; G06F 21/16; G06F 11/3624; G06F 11/3636; G06F 21/57
See application file for complete search history.

(56) References Cited

U.S. PATENT DOCUMENTS

| 8,479,161 | B2 | 7/2013 | Weigert |
| 10,579,803 | B1 | 3/2020 | Mueller et al. |
| 10,984,102 | B2 | 4/2021 | Boulton |
| 11,017,094 | B2 | 5/2021 | Wei et al. |
| 11,036,868 | B2 | 6/2021 | Sheridan et al. |
| 11,537,400 | B1* | 12/2022 | Zhang ........................ G06F 8/51 |
| 2014/0245440 | A1* | 8/2014 | Reynolds .............. G06F 21/563 726/23 |
| 2020/0097662 | A1 | 3/2020 | Hufsmith et al. |
| 2021/0029151 | A1 | 1/2021 | Brooks |
| 2023/0161880 | A1* | 5/2023 | Han ....................... G06F 21/563 726/3 |

* cited by examiner

*Primary Examiner* — Quazi Farooqui
(74) *Attorney, Agent, or Firm* — Sterne, Kessler, Goldstein & Fox P.L.L.C.

(57) ABSTRACT

Systems and methods are disclosed herein for determining a source of leaked sensitive data (e.g., passwords, insecure coding, log information, any information that should not exist, etc.) in compiled software applications. According to some aspects, a computing device (e.g., a software analysis device, a cloud-computing device, a server, a smart device, binary file/code scanner, etc.) may receive scan pattern information and a binary file of a software application. The computing device may be configured to determine one or more executable files of the software application based on the binary file. Based on the scan pattern information and the one or more executable files, the computing device may determine location information for one or more sensitive data elements configured with the software application. The computing device may use the location information for each of the one or more sensitive data elements to determine a respective source of the sensitive data element.

20 Claims, 4 Drawing Sheets

US 11,921,863 B2

DETERMINING A SOURCE OF A VULNERABILITY IN SOFTWARE

BACKGROUND

Software applications, such as mobile applications and/or the like, undergo many changes and revisions before being distributed to the public. Information indicative of changes and revisions to an application, and/or any other type of sensitive information (e.g., passwords, etc.) may enable a device and/or system associated with the application to be compromised when such information is inadvertently included with the application. Application scanning and analysis methods such as static application security testing (SAST) and/or dynamic application security testing (DAST) may use predefined algorithms to identify sensitive information and/or application vulnerabilities in the source code of applications, but are ineffective for determining sensitive data in compiled applications, such as applications distributed to the public. Because application scanning and analysis methods such as SAST, DAST, and/or the like operate on the source code of an application, they are unable to determine sensitive data in data files of applications rather than the source code. For example, such application scanning and analysis methods use pre-defined scan patterns that are inadaptable to code patterns specific to certain types of applications, such as company/business-specific applications.

BRIEF DESCRIPTION OF THE DRAWINGS

The accompanying drawings, which are incorporated in and constitute a part of this specification, illustrate aspects and together with the description, serve to explain the principles described herein.

DETAILED DESCRIPTION

Figure 1:
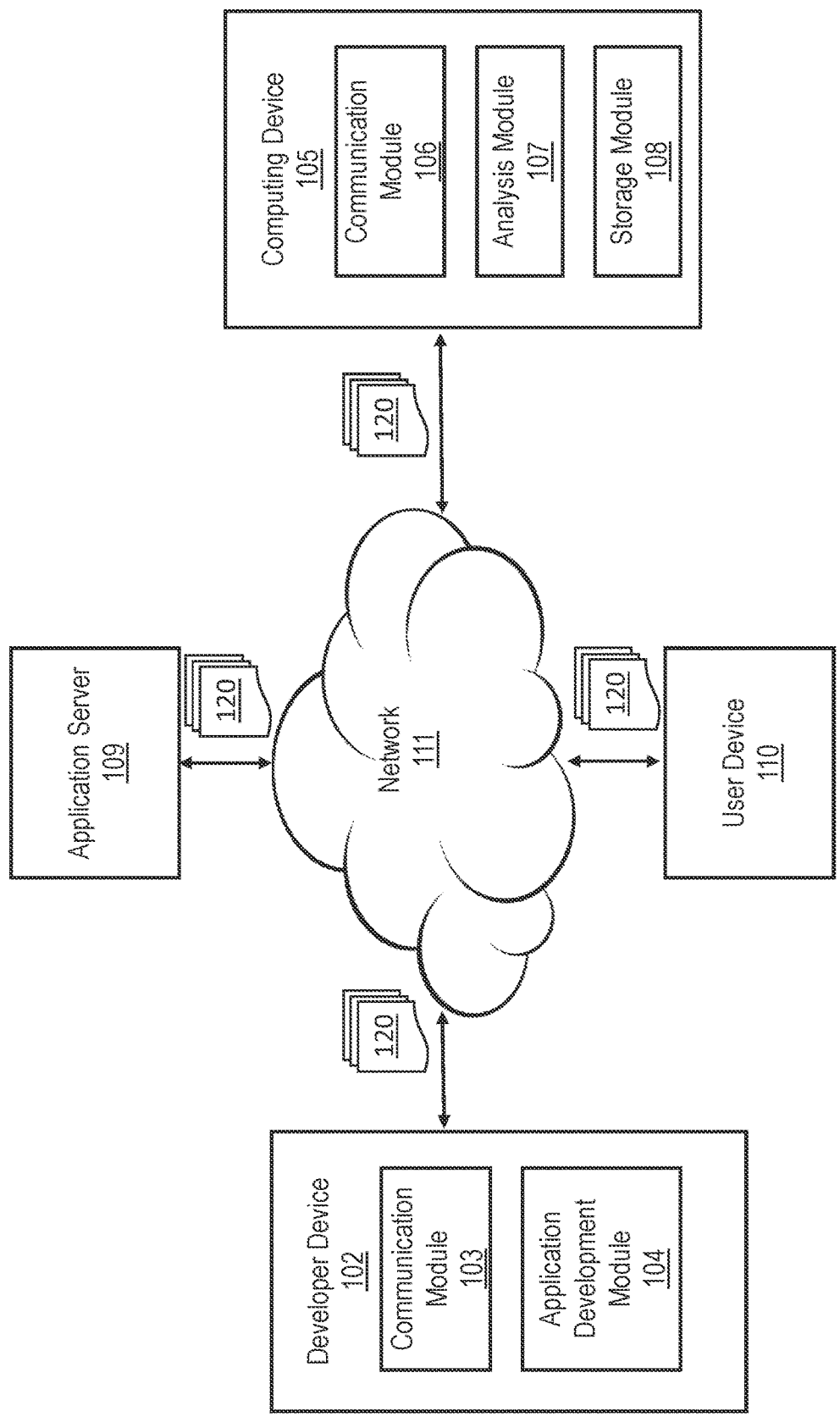
FIG. 1 is a block diagram of an example system for determining a source of leaked sensitive data in an application accessible via an application vulnerability, according to some aspects.

Examples of applications for the below methods, media, and systems are numerous, but a few are given here merely to indicate possible uses. Other applications will be readily apparent to one of skill in the relevant arts and are likewise contemplated by this disclosure. Moreover, description of "an embodiment" or "one embodiment" should not be construed as limiting the scope of the disclosure, as elements, sub-elements and features of a given embodiment may also be used in other aspects of the disclosure. While methods described herein may have steps described in a specified order, it will be understood that some of those steps may be re-arranged or performed in a different order. Additionally, aspects may be given describing applications to particular industries or commercial fields, but scope of the disclosure is not so limited.

Descriptions are given with reference to the figures included herein. When possible and for clarity, reference numbers are kept consistent from figure to figure. Some of the figures are simplified diagrams, which are not to be interpreted as drawn to scale or spatially limiting for the described aspects. Where appropriate, the particular perspective or orientation of a figure will be given to increase understanding of the depicted features.

As will be appreciated by one skilled in the art, methods and systems described herein may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices. Note that in various instances this detailed disclosure may refer to a given entity performing some action. It should be understood that this language may in some cases mean that a system (e.g., a computer) owned and/or controlled by the given entity is actually performing the action.

A computing device (e.g., a software analysis device, an application scanner, etc.) may scan software (e.g., applications, programs, etc.). In some aspects, analyzing software may include scanning the software. The computing device may scan and/or analyze software, for example, such as a compiled application, an application distributed to the public (e.g., customer, etc.), binary files, and/or the like, and determine sensitive data in the software. The sensitive data may be leaked data, for example, such as passwords, insecure coding, log information, and/or any information that should not exist in a version of the software that is distributed to business customers, consumers, end-users, and/or the like. The computing device may be configured with one or more scan patterns for common sensitive data and/or may use one or more user-defined and/or customer scan patterns for specific software. As discussed in further detail below, a scan pattern is a set of expressions and/or data that can be used by the computer to identify a particular type and/or content of sensitivity and/or vulnerability. The scan patterns used by the computing device may include configurations to suppress findings, for example, based on an exclusion scan pattern and/or a file name with or without a line number and/or a description. Each scan pattern may be associated with a severity level (and/or vulnerability level) that may be used to rank determined sensitive data based on the potential risk of the data and the likelihood that the data is actually "sensitive" (rather than a false positive). When sensitive data is determined in the software, the computing device may determine, tag, and/or indicate a portion and/or line of source code of the software associated with the sensitive data. An entity, such as a developer, other software, a computing service, and/or the like associated with the sensitive data may be determined and a notification, an alert, a message, and/or the like may be sent to the entity. The entity may then perform one or more actions to remove, obfuscate, and/or remediate the sensitive data and/or associated vulnerability. Removal, obfuscation, and/or remediation of the sensitive data and/or associated vulnerability may be prioritized, for example, based on the ranking associated with the sensitive data.

Reference will now be made in detail to exemplary aspects of the disclosed technology, examples of which are illustrated in the accompanying drawings and disclosed herein. Wherever convenient, the same references numbers will be used throughout the drawings to refer to the same or like parts. The following aspects describe methods and systems for determining a source of a vulnerability in software (e.g., a compiled application, binary files, binary code, an application distributed to the public, machine code, object code, etc.).

According to some aspects, FIG. 1 illustrates various aspects of an example system 100 for determining a source of leaked sensitive data in an application (e.g., a compiled application, binary files, binary code, an application distributed to the public, machine code, object code, etc.) accessible via an application vulnerability. The system 100 may include a developer device 102 (e.g., a software developer device, a computing device, etc.), a computing device 105 (e.g., a software analysis device, a cloud-computing device, a server, a smart device, etc.), an application server 109, and a user device 110 (e.g., a customer device, a smart device, a mobile device, an Internet-of-Things (IoT) device, etc.) communicatively coupled to a network 111. The network 111 may include a software distribution network, a cloud-based platform, a private network, a public network, a secured network, a local area network, a wide area network, Internet, a content access network, a content distribution network, a wired network, a wireless network, a cellular network, a packet-switched network, and/or the like.

The developer device 102 may include a communication module 103 for providing an interface to a user (e.g., a software developer, a computer programmer, etc.) to interact with the developer device 102 and/or the computing device 105. The communication module 106 may be any interface for presenting and/or receiving information to/from the user, such as user feedback. An interface may be a graphical user interface (GUI) and/or a communication interface such as a web browser (e.g., Internet Explorer®, Mozilla Firefox®, Google Chrome®, Safari®, etc.). Other software, hardware, and/or interfaces may be used to provide communication between the user and one or more of the developer device 102, the computing device 105, the application server 109, and/or any other device and/or component of the system 100. The communication module 103 may request or query various files from a local source and/or a remote source. The communication module 103 may transmit data to a local or remote device such as the computing device 105, the application server 109, and/or any other device and/or component of the system 100.

The developer device 102 may include and/or be configured with an application, a set of applications, software, software modules, hardware, combinations thereof, and/or the like to design and/or develop a software application. For example, the developer device 102 may include an application development module 104. The application development module 104 may be used to design, develop, and/or distribute applications to customers. An application 120 that has been designed, developed, and prepared to be distributed to customers (e.g., the user device 110, etc.) may be submitted, for example, to the application server 109 for distribution, downloaded by the user device 110, accessed by the user device 110, sent by the computing device 105, and/or received by the computing device 105 for analysis.

The application server 109 may provide services related to applications. The application server 109 may be, include, and/or be in communication with an application distribution platform. The application server 109 may run one or more application services to provide data, handle requests, and/or otherwise facilitate the operation of applications for the user. For example, the application server 109 may include an application store (e.g., Apple® App Store, Google® Play, Amazon® App Store, an application repository, etc.) configured to allow users (e.g., the user device 110, etc.) to purchase, download, install, upgrade, and/or otherwise manage applications, such as the application 120. The application server 109 may be configured to allow users to download applications (e.g., the application 120, etc.) to a device, such as the user device 110, the computing device 105, and/or the like. For example, the user device 110 may be any device that can use binary files and/or binary code of the application 120.

According to some aspects, the developer device 102 may submit the source code of the application 120 (and/or any other application) to the computing device 105 for analysis. The computing device 105 may compile the source code of application 120 (and/or any other application) to determine the binary code of the application 120 (and/or any other application). According to some aspects, the developer device 102 may submit binary code and/or binary files associated with the application 120 (and/or any other application) to the computing device 105 for analysis. For example, the developer device 102 may submit binary code and/or binary files associated with the application 120 (and/or any other application) to the computing device 105 as part of a quality assurance analysis process for applications distributed to the application server 109 and/or the like. According to some aspects, a quality assurance analysis process for applications distributed to the application server 109 and/or the like may be an automatically invoked process, a user-invoked process, combinations thereof, and/or the like. For example, a quality assurance analysis process for applications distributed to the application server 109 and/or the like may instruct that binary code and/or binary files associated with applications, such as the application 120 and/or the like, be submitted to the computing device 105 whenever the applications are submitted for distribution. According to some aspects, a quality assurance analysis process for applications distributed to the application server 109 and/or the like may be invoked to determine whether the applications function and/or operate as intended. According to some aspects, a quality assurance analysis process for applications distributed to the application server 109 and/or the like may be invoked to determine whether the applications are subject to vulnerabilities such as buffer overflows, format string vulnerabilities, canonicalization issues, inadequate privilege checking (e.g., are users authenticated at every doorway to application features, etc.), script injection (e.g., is there an ability to run script, etc.), error handling (e.g., how does an application address and/or respond to errors, etc.), and/or information leakage (does the application contain sensitive data such as passwords, log information, any information that should not exist, etc.).

The computing device 105 may include a communication module 106 for providing an interface to interact with the computing device 105, the developer device 102, the application server 109, and/or any other device and/or component of the system 100. The communication module 106 may be any interface for presenting and/or receiving information to/from a user, such as an indication of sensitive data in a software application (e.g., the application 120, etc.) and/or a source (e.g., the developer device 102, a predictive model, an application, a software service, etc.) associated with the sensitive data. An interface may be a graphical user interface (GUI), a communication interface such as a web browser (e.g., Internet Explorer®, Mozilla Firefox®, Google Chrome®, Safari®, or the like), or a communication platform (e.g., Slack messaging platform, email, aPagerDuty notification system, etc.). Other software, hardware, and/or interfaces may be used to provide communication between the user and one or more of the computing device 105, the developer device 102, the application server 109, and/or any other device and/or component of the system 100. The communication module 106 may request or query various files from a local source and/or a remote source. The communication module 106 may transmit data to a local or remote device such as the computing device 105, the application server 109, and/or any other device and/or component of the system 100.

The computing device 105 may receive the application 120 from the developer device 102 and/or the computing device 105 may receive and/or download the application 120 from the application server 109. The computing device 105 may scan and/or analyze (and/or the like) the application 120, for example, the binary code and/or binary files of the application 120, and determine sensitive data (e.g., passwords, insecure coding, log information, any information that should not exist, etc.) in the application 120.

For example, the computing device 105 may include an analysis module 107. The analysis module 107 may include an application, a set of applications, software, software modules, hardware, and/or combinations thereof, that can be configured to analyze software binary code, determine sensitive information within the binary code, determine a source of the sensitive information, and/or determine a vulnerability assessment and/or a security risk ranking of the sensitive information.

The analysis module 107 may receive, for example, a binary file of the application 120 and a configuration file comprising scan pattern information. The application 120, such as each executable file and/or resource file of application 120, may be decompiled, for example, by the analysis module 107, into an assembly representation and/or other low-level representation of the application 120. The scan pattern information may indicate one or more scan patterns. According to some aspects, a scan pattern may indicate and/or include libraries (e.g., collections of subroutines or classes used to develop applications, etc.), such as static libraries, dynamic libraries, shared libraries, etc., an application has links to. According to some aspects, a scan pattern may be a list of expressions and/or information sought to be identified. According to some aspects, a scan pattern may be any information that instructs and/or informs the computing device 105 of any element, item, code, etc. to be identified within a binary file (and/or binary code) of an application, or actions and/or steps that should be performed by the computing device 105 to determine sensitive data within a binary file (and/or binary code) of an application.

According to some aspects, the analysis module 107 may receive scan pattern information based on a selection of one or more scan patterns via a graphical user interface (GUI) output via the communication module 106. Scan pattern information used by the analysis module 107 may include the selected one or more scan patterns. According to some aspects, the analysis module 107 may access the storage module 108 and/or the like to obtain a list of scan patterns for general usage. The list of scan patterns may include, for example, scan patterns that indicate problems in many applications. According to some aspects, the analysis module 107 may receive a list of scan patterns from a third-party source. According to some aspects, the list of scan patterns may be provided and/or customized by a user (e.g., via the communication module 106, etc.). According to some aspects, the analysis module 107 may determine a union set of patterns from a list of scan patterns and/or the like. The analysis module 107 may determine/use any scan pattern to determine sensitive data in compiled applications.

According to some aspects, the analysis module 107 may determine one or more scan patterns of a plurality of scan patterns based on a type and/or brand of the application 120. For example, a scan pattern may be determined and/or selected based on an application being associated with a type of device operating system (e.g., Apple® iOS, Google® Android, Bada®, Windows® OS, Blackberry® OS, etc.). A scan pattern may be and/or include information specified as a regular expression and/or the like. For example, the expression "localHttpResponseCode" may be a scan pattern associated with an application for a type of device operating system that causes a search for the expression in binary code for the application. For example, the analysis module 107 scanning for the "localHttpResponseCode" pattern in an Apple® iOS binary "ExampleApp" may be performed as follows:

otool -tvV ExampleApp|grep localHttpResponseCode

Each match determined by the analysis module 107 may include and/or be an objectionable string containing an address (e.g., binary addresses, memory addresses, physical addresses, etc.), for example, at the beginning of the line. An example output of the analysis module 107 is shown below:

000000000002a7f4 adr x8, #0x2913c; literal pool for: "localHttpResponseCode"

The analysis module 107 may look up the address 000000000002a7f4 in a symbolication file, index file, and/or the like for the application 120. The analysis module 107 may access a storage module 108. The storage module 108 may store symbolication files, index files, and/or the like for the application 120 generated during a build process of the application 120. The analysis module 107 may look up the address in the symbolication file, index file, and/or the like to obtain the file name and/or line of source code for the application 120 that contains the objectionable string. For example, the analysis module 107, looking up the address 000000000002a7f4 may be performed as follows:

atos -arch arm64 -o

ExampleApp.framework.dSYM/Contents/Resources/ DWARF/ExampleDirectory 000000000002a7f4

An example output of the analysis module 107 is shown below:

FileName.urlSession(_:dataTask:didReceive:completionHandler:) (inExampleApp) (FileName.swift:664)

The analysis module 107 may use the file name and line number determined from looking up the address in the symbolication file, index file, and/or the like and execute a version control function, system, service, and/or the like to determine a source of sensitive data. For example, the analysis module 107 may determine that a developer and/or the developer device 102 edited that line of the application 120 most recently. For example, the analysis module 107 may use Git version control to determine which developer edited that line most recently and/or contact/identification information for the developer and/or the developer device 102.

For example, the analysis module 107 may look up line 664 of FileName.swift:664 as follows:

git blame -L 664,+1 --porcelain

"ExampleApp/SubDirectory/FileName.swift"
An example output of the analysis module 107 is shown below:

1abcd2a34c56a1eeee1234f4123456cba12340d 650 664 2
   author Doe, John
   author-mail <John.Doe@company.com>
   author-time 1578427658
   author-tz -0500
   committer Doe, John
   committer-mail <John.Doe@company.com>
   committer-time 1578428567
   committer-tz -0500
   summary Converts base network operation and tests to Swift.
   filename Directory/SubDirectory/FileName.swift
   public func urlSession(_session: URLSession.

As shown in the example output above, the analysis module 107 may determine that "John Doe" is a developer associated with the developer device 102 that edited the application 120 most recently. Also, as shown, the output may include a time when the edits were made, contact information for the developer, and/or a summary of the edit actions. An output from the analysis module 107 may include any information that may be used to identify a source of any sensitive information associated with an application.

According to some aspects, scan patterns used by the analysis module 107 may include configurations to suppress findings, for example, based on an exclusion scan pattern and/or a file name with/without a line number/description. For example, in the configuration file that contains the search patterns, each pattern may be associated with a list of exceptions to suppress certain output. These exceptions can be specified by using the following example references shown in Table 1.

TABLE 1

| Exceptions | Description |
| --- | --- |
| File name or file pattern | A complete file name will suppress all findings for that search pattern in the specified file. A file pattern (such as a file extension) will suppress all findings in files with names matching the pattern |
| File name with line number | A file name with a line number (e.g. "FileName.swift:664") will suppress a finding for the search pattern at that line in the specified file |
| Developer Name | A developer name will suppress findings resulting from edits made by the named developer |
| Exclusion pattern | A regular expression specified as an exclusion will suppress matching findings that otherwise matched the search pattern. In other words, the output for the search pattern will be all matches that do not match the exclusion pattern |

According to some aspects, each scan pattern used by the analysis module 107 to determine a source of sensitive data may be associated with a severity level (and/or a vulnerability level) that may be used to rank determined sensitive data based on the potential risk of the data and/or the likelihood that the data is actually "sensitive" (rather than a false positive). The storage module 108 may store severity level information for any type of scan pattern used to determine a source of sensitive data in any type of compiled software application. The analysis module 107 may access and/or query the storage module 108 to retrieve severity level assessment information. For example, in a configuration file containing scan patterns, each pattern may be accompanied by a severity level. The storage module 108 may store the configuration file. The severity level may be assigned to the pattern by considering the likelihood that a match indicates an exploitable security problem, the likelihood of a false-positive match, and whether the pattern is specific to the application being scanned.

Figure 2:
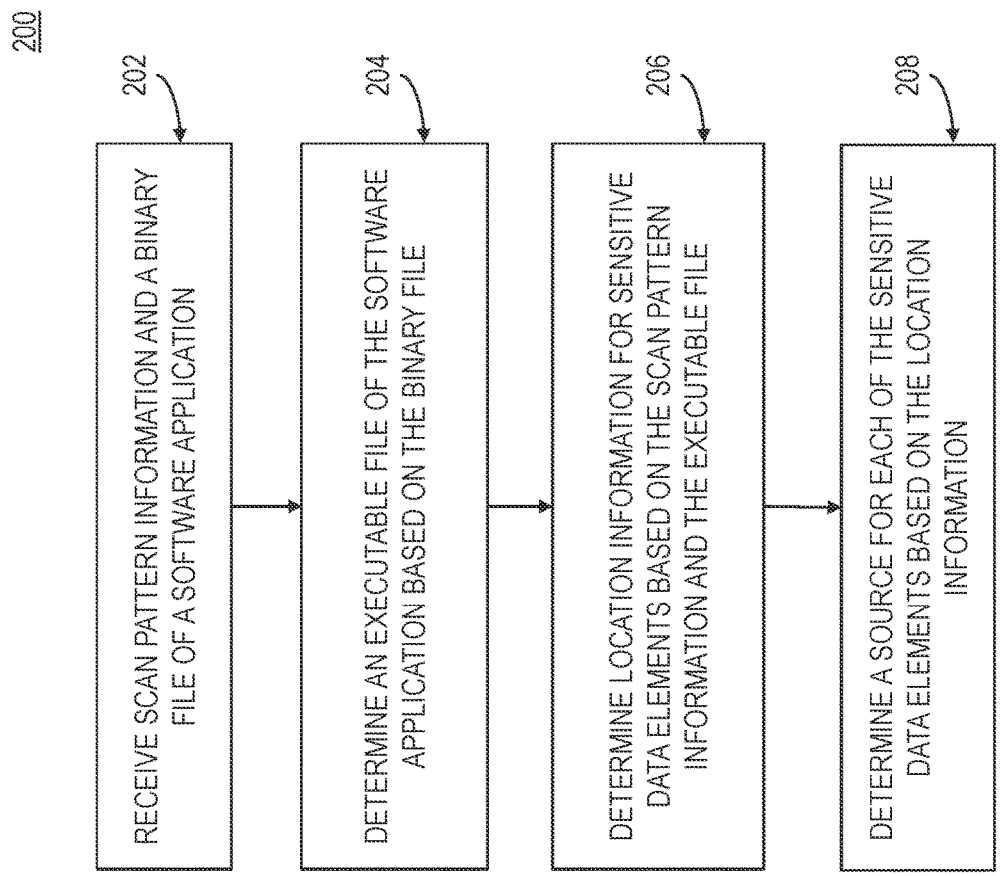
FIG. 2 is a flowchart representing an example method for determining a source of leaked sensitive data in an application accessible via an application vulnerability, according to some aspects.

FIG. 2 illustrates an example computer-implemented method 200 for determining a source of leaked sensitive data in an application (e.g., a distributed application, etc.) accessible via an application vulnerability. According to method 300, a computing device (e.g., the computing device 104 of FIG. 1, a software analysis device, an application scanner, etc.) may use one or more scan patterns (e.g., pre-defined scan patterns, custom scan patterns, application-specific scan patterns, etc.) to scan and/or analyze a software application, for example, such as a compiled application, an application distributed to the public (e.g., customer, etc.), binary files, and/or the like and determine sensitive data (e.g., passwords, insecure coding, log information, any information that should not exist, etc.) in the application. Each scan pattern may be associated with a severity level and/or vulnerability level that may be used to rank determined sensitive data based on the potential risk of the data and the likelihood that the data is actually "sensitive" (rather than a false positive). When sensitive data is determined in the software, the computing device may determine, tag, and/or indicate a portion and/or a line of source code of the software associated with the sensitive data, determine an entity (e.g., a developer, an application, a service, etc.) associated with the sensitive data, and provide a notification to the entity to facilitate removal, obfuscation, and/or remediation of the sensitive data.

Method 200 can be performed by processing logic that can comprise hardware (e.g., circuitry, dedicated logic, programmable logic, microcode, etc.), software (e.g., instructions executing on a processing device), and/or a combination thereof. It is to be appreciated that not all steps may be needed to perform the disclosure provided herein. Further, some of the steps can be performed simultaneously, or in a different order than shown in FIG. 2, as will be understood by a person of ordinary skill in the art. Method 200 shall be described with reference to elements of FIG. 1 and can be performed by computing device 104 of FIG. 1 and/or computer system 400 of FIG. 4. However, method 200 is not limited to the specific aspects depicted in those figures and other systems can be used to perform the method as will be understood by those skilled in the art.

In 202, a computing device (e.g., the computing device 104 of FIG. 1, a software analysis device, an application scanner, etc.) may receive scan pattern information and a binary file of a software application. Receiving the scan pattern information may include receiving a configuration file comprising the scan pattern information. The scan pattern information may indicate a plurality of scan patterns. The computing device may determine one or more scan patterns based on a type of the software application. In some instances, receiving the scan pattern information may include receiving the scan pattern information based on a selection of one or more scan patterns via a graphical user interface (GUI). The scan pattern information may include the selected one or more scan patterns.

In 204, the computing device may determine, based on the binary file, one or more executable files of the software application. Determining the one or more executable files (and/or data files) based on the binary file of the software application may include unpacking an application archive file (e.g., an Apple® iOS application archive file, etc.), a package file (e.g., an Android® package file, etc.), and/or the like including the binary file such as individual resource files and/or executable files of the application. Each executable file may be decompiled into an assembly representation and/or other low-level representation of the application.

In 206, the computing device may determine, based on the scan pattern information and the one or more executable files, location information for one or more sensitive data elements configured with the software application. The one or more sensitive data elements may include, for example, one or more of: credential information, cryptographic information, syntax errors, logic errors, or objectionable data. Determining the location information for the one or more sensitive data elements may include scanning, based on one or more scan patterns indicated by the scan pattern information, the one or more executable files. The computing device may determine, based on scanning the one or more executable files, the location information.

In 208, the computing device may determine for each of the one or more sensitive data elements, based on the location information, a respective source of the sensitive data element. For example, the location information may include one or more addresses (e.g., binary addresses, memory addresses, physical addresses, etc.) associated with the one or more sensitive data elements. Determining the respective source of each of the one or more sensitive data elements may include determining, based on the one or more addresses associated with the one or more sensitive data elements and a symbolication file of the software application, one or more portions of source code of the software application. The one or more portions of the source code may indicate the one or more sensitive data elements. The computing device may determine, based on the one or more portions of the source code and source control information for the software application, the respective source of each of the one or more sensitive data elements.

For example, the one or more scan patterns may each indicate specific elements for the computing device to scan for within the one or more executable files. When the specific elements are determined within the one or more executable files, each of the specific elements may be associated with an address (e.g., memory address, etc.) included in the line of the scanned executable file (e.g., binary file, etc.) where the specific element is identified. The computing device may look up the address included in the line of the scanned executable file in the symbolication file produced during a build of the software application to determine the line of source code that contains the sensitive data. The computing device may use a version control system and/or process to determine the source of the sensitive data, such as a developer that edited the line of source code. In some instances, the source of sensitive data may include a predictive model (e.g., a machine learning model trained to create software applications, etc.), another software application, and/or a software service (e.g., Salesforce® platform, Office 365® cloud-computing platform, Amazon Web Services, etc.)

In some instances, the method 200 may further include causing display of an indication of the respective source of each of the one or more sensitive data elements. In some instances, the method 200 may further include sending, to the respective source of each of the one or more sensitive data elements, a notification of the sensitive data element.

Figure 3:
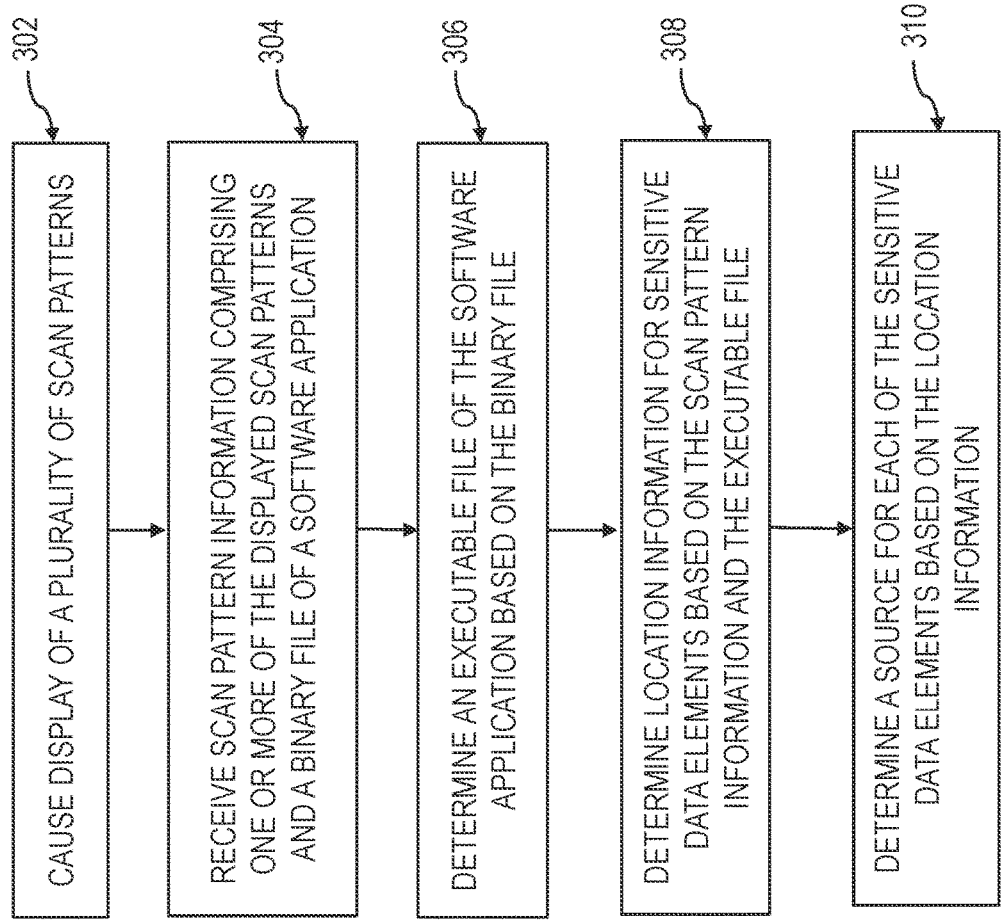
FIG. 3 is a flowchart representing an example method for determining a source of leaked sensitive data in an application accessible via an application vulnerability, according to some aspects.

FIG. 3 illustrates an example computer-implemented method 300 for determining a source of leaked sensitive data in an application (e.g., a distributed application, etc.) accessible via an application vulnerability. According to method 300, a computing device (e.g., the computing device 104 of FIG. 1, a software analysis device, an application scanner, etc.) may use one or more scan patterns (e.g., pre-defined scan patterns, custom scan patterns, application-specific scan patterns, etc.) to scan and/or analyze a software application, for example, such as a compiled application, an application distributed to the public (e.g., customer, etc.), binary files, and/or the like and determine sensitive data (e.g., passwords, insecure coding, log information, any information that should not exist, etc.) in the application. Each scan pattern may be associated with a severity level and/or vulnerability level that may be used to rank determined sensitive data based on the potential risk of the data and the likelihood that the data is actually "sensitive" (rather than a false positive). When sensitive data is determined in the software, the computing device may determine, tag, and/or indicate a portion and/or line of source code of the software associated with the sensitive data, determine an entity (e.g., a developer, an application, a service, etc.) associated with the sensitive data, and provide a notification to the entity to facilitate removal, obfuscation, and/or remediation of the sensitive data.

Method 300 can be performed by processing logic that can comprise hardware (e.g., circuitry, dedicated logic, programmable logic, microcode, etc.), software (e.g., instructions executing on a processing device), and/or a combination thereof. It is to be appreciated that not all steps may be needed to perform the disclosure provided herein. Further, some of the steps can be performed simultaneously, or in a different order than shown in FIG. 3, as will be understood by a person of ordinary skill in the art. Method 300 shall be described with reference to elements of FIG. 1 and can be performed by computing device 104 of FIG. 1 and/or computer system 400 of FIG. 4. However, method 300 is not limited to the specific aspects depicted in those figures and other systems can be used to perform the method as will be understood by those skilled in the art.

In 302, a computing device (e.g., the computing device 104 of FIG. 1, a software analysis device, an application scanner, etc.) may cause, based on a type of software application, display of a plurality of scan patterns. For example, a graphical user interface (GUI) associated with the computing device may display the plurality of scan patterns.

In 304, the computing device may receive, based on a selection of one or more scan patterns of the plurality of scan patterns, a binary file of the software application and scan pattern information. The scan pattern information may include the selected one or more scan patterns.

In 306, the computing device may determine, based on the binary file, one or more executable files of the software application. Determining the one or more executable files based on the binary file of the software application may include unpacking an application archive file (e.g., an Apple® iOS application archive file, etc.), a package file (e.g., an Android® package file, etc.), and/or the like including the binary file such as individual resource files and/or executable files of the application. Each executable file may be decompiled into an assembly representation and/or other low-level representation of the application.

In 308, the computing device may determine, based on the scan pattern information and the one or more executable files, location information for one or more sensitive data elements configured with the software application. The one or more sensitive data elements may include, for example, one or more of: credential information, cryptographic information, syntax errors, logic errors, or objectionable data. Determining the location information for the one or more sensitive data elements may include scanning, based on one or more scan patterns indicated by the scan pattern information, the one or more executable files. The computing device may determine, based on scanning the one or more executable files, the location information.

In 310, the computing device may determine for each of the one or more sensitive data elements, based on the location information, a respective source of the sensitive data element. For example, the location information may include one or more addresses associated with the one or more sensitive data elements. Determining the respective source of each of the one or more sensitive data elements may include determining, based on the one or more addresses associated with the one or more sensitive data elements and a symbolication file of the software application, one or more portions of source code of the software application. The one or more portions of the source code may indicate the one or more sensitive data elements. The computing device may determine, based on the one or more portions of the source code and source control information for the software application, the respective source of each of the one or more sensitive data elements.

For example, the one or more scan patterns may each indicate specific elements for the computing device to scan for within the one or more executable files. When the specific elements are determined within the one or more executable files, each of the specific elements may be associated with an address (e.g., binary addresses, memory addresses, physical addresses, etc.) included in the line of the scanned executable file (e.g., binary file, etc.) where the specific element is identified. The computing device may look up the address included in the line of the scanned executable file in the symbolication file produced during a build of the software application to determine the line of source code that contains the sensitive data. The computing device may use a version control system and/or process to determine the source of the sensitive data, such as a developer that edited the line of source code. In some instances, the source of sensitive data may include a predictive model (e.g., a machine learning model trained to create software applications, etc.), another software application, and/or a software service (e.g., Salesforce® platform, Office 365® cloud-computing platform, Amazon Web Services, etc.)

In some instances, the method 300 may further include causing display of an indication of the respective source of each of the one or more sensitive data elements. In some instances, the method 300 may further include sending, to the respective source of each of the one or more sensitive data elements, a notification of the sensitive data element.

Figure 4:
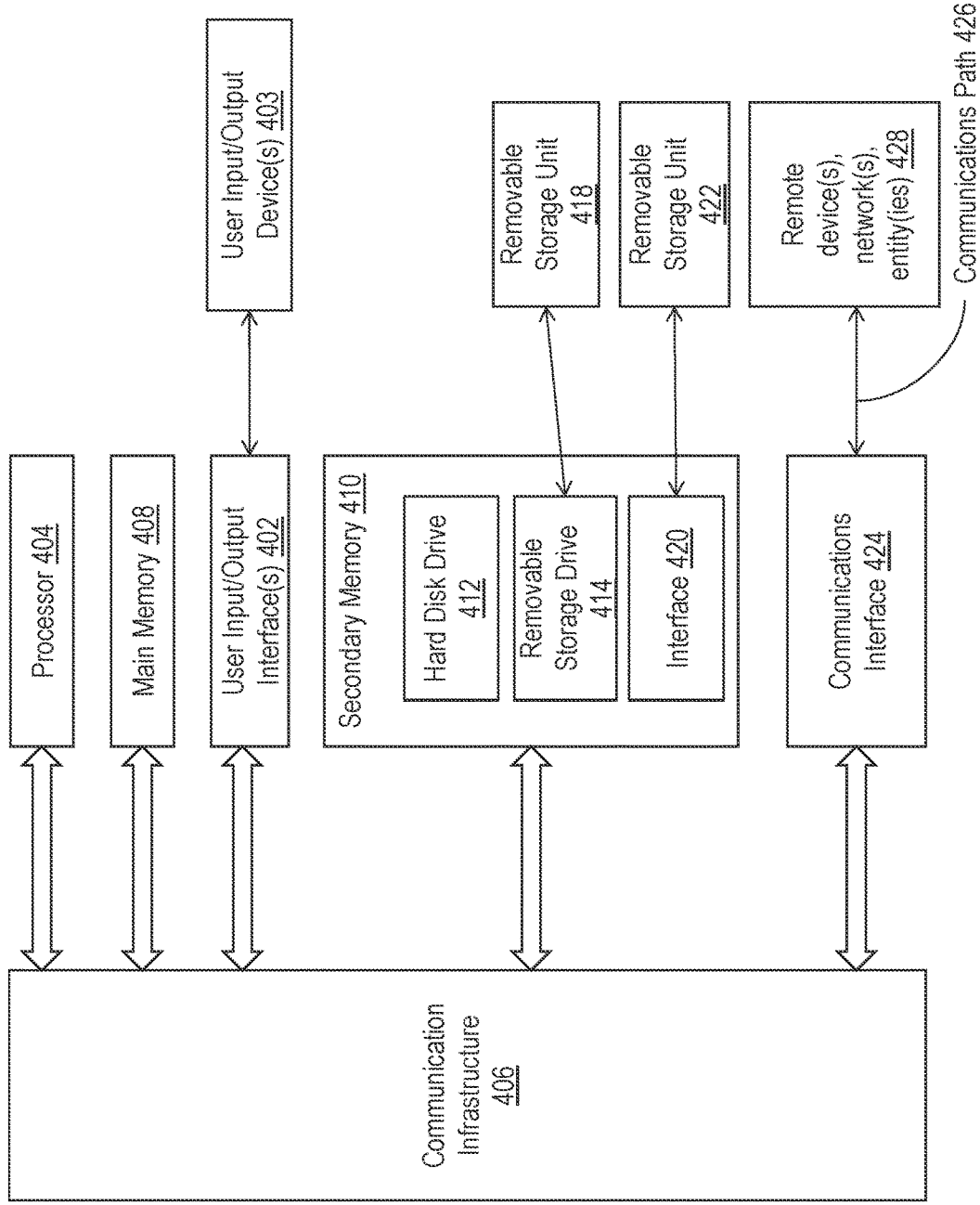
FIG. 4 illustrates a computer system that may implement the example methods and support the example systems for determining a source of leaked sensitive data in an application accessible via an application vulnerability, according to some aspects.

Various aspects of this disclosure can be implemented, for example, using one or more computer systems, such as computer system 400 shown in FIG. 4. Computer system 400 can be used, for example, to implement any method (e.g., the method 300, etc.) described herein. Computer system 400 can be any computer capable of performing the functions described herein.

Computer system 400 may include one or more processors (also called central processing units, or CPUs), such as a processor 404. Processor 404 may be connected to a communication infrastructure or bus 406.

Computer system 400 may also include user input/output device(s) 403, such as monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random-access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 464. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein. For example, the instructions, when executed by one or more processors, cause the processors to perform a method for managing third party applications on a computing apparatus as described herein.

Based on the teachings contained in this disclosure, it will be apparent to persons skilled in the relevant art(s) how to make and use aspects of this disclosure using data processing devices, computer systems and/or computer architectures other than that shown in FIG. 4. In particular, aspects can operate with software, hardware, and/or operating system aspects other than those described herein.

Descriptions to an embodiment contemplate various combinations, components and sub-components. However, it will be understood that other combinations of the components and sub-components may be possible while still accomplishing the various aims of the present application. As such, the described aspects are merely examples, of which there may be additional examples falling within the same scope of the disclosure.

What is claimed is:

1. A computer-implemented method for determining a source of sensitive data, the method comprising:
   receiving scan pattern information and a binary file of a software application;
   identifying, based on the binary file, one or more executable files of the software application;
   determining, based on the scan pattern information and the one or more executable files, location information for one or more sensitive data elements configured with the software application; and
   determining for each of the one or more sensitive data elements, based on the location information, a respective source of the sensitive data element.

2. The computer-implemented method of claim 1, wherein the receiving the scan pattern information comprises receiving a configuration file comprising the scan pattern information.

3. The computer-implemented method of claim 1, wherein the receiving the scan pattern information comprises:
   receiving the scan pattern information based on a selection of one or more scan patterns via a graphical user interface (GUI), wherein the scan pattern information comprises the selection of one or more scan patterns.

4. The computer-implemented method of claim 1, wherein the scan pattern information indicates one or more scan patterns, and wherein the computer-implemented method further comprises determining the one or more scan patterns based on a type of the software application.

5. The computer-implemented method of claim 1, wherein the one or more sensitive data elements comprise one or more of credential information, cryptographic information, syntax errors, logic errors, or objectionable data.

6. The computer-implemented method of claim 1, wherein determining the location information for the one or more sensitive data elements comprises:
   scanning the one or more executable files based on one or more scan patterns indicated by the scan pattern information; and
   determining the location information based on the scanning the one or more executable files.

7. The computer-implemented method of claim 1, wherein the location information comprises one or more addresses associated with the one or more sensitive data elements, and wherein determining a respective source of each of the one or more sensitive data elements comprises:
   determining, based on the one or more addresses associated with the one or more sensitive data elements and a symbolization file of the software application, one or more portions of source code of the software application, wherein the one or more portions of the source code indicate the one or more sensitive data elements; and
   determining the respective source of each of the one or more sensitive data elements based on the one or more portions of the source code and source control information for the software application.

8. The computer-implemented method of claim 1, further comprising causing display of an indication of the respective source of each of the one or more sensitive data elements.

9. The computer-implemented method of claim 1, further comprising sending, to the respective source of each of the one or more sensitive data elements, a notification of the sensitive data element.

10. The computer-implemented method of claim 1, wherein the respective source of each of the one or more sensitive data elements comprises one or more of a developer of the software application, a predictive model, or another software application.

11. A non-transitory computer-readable device having instructions stored thereon that, when executed by one or more computing devices, cause the one or more computing devices to perform operations comprising:
   receiving scan pattern information and a binary file of a software application;
   identifying, based on the binary file, one or more executable files of the software application;
   determining, based on the scan pattern information and the one or more executable files, location information for one or more sensitive data elements configured with the software application; and
   determining for each of the one or more sensitive data elements, based on the location information, a respective source of the sensitive data element.

12. The non-transitory computer-readable device of claim 11, the receiving the scan pattern information comprising receiving a configuration file comprising the scan pattern information.

13. The non-transitory computer-readable device of claim 11, wherein the scan pattern information indicates one or more scan patterns, and wherein the operations further comprise determining the one or more scan patterns based on a type of the software application.

14. The non-transitory computer-readable device of claim 11, wherein the one or more sensitive data elements comprise one or more of credential information, cryptographic information, syntax errors, logic errors, or objectionable data.

15. The non-transitory computer-readable device of claim 11, the determining the location information for the one or more sensitive data elements comprising:
   scanning the one or more executable files based on one or more scan patterns indicated by the scan pattern information; and
   determining the location information based on scanning the one or more executable files.

16. The non-transitory computer-readable device of claim 11, wherein the location information comprises one or more addresses associated with the one or more sensitive data elements, and the determining the respective source of each of the one or more sensitive data elements comprises:
   determining, based on the one or more addresses associated with the one or more sensitive data elements and a symbolication file of the software application, one or more portions of source code of the software application, wherein the one or more portions of the source code indicate the one or more sensitive data elements; and
   determining the respective source of each of the one or more sensitive data elements based on the one or more portions of the source code and source control information for the software application.

17. The non-transitory computer-readable device of claim 11, the operations further comprising sending, to the respective source of each of the one or more sensitive data elements, a notification of the sensitive data element.

18. The non-transitory computer-readable device of claim 11, wherein the respective source of each of the one or more sensitive data elements comprises one or more of a developer of the software application, a predictive model, or another software application.

19. The non-transitory computer-readable device of claim 11, the receiving the scan pattern information comprising:
   receiving the scan pattern information based on a selection of one or more scan patterns via a graphical user interface (GUI), wherein the scan pattern information comprises the selected one or more scan patterns.

20. A computer-implemented method for determining a source of sensitive data, the method comprising:
   causing, based on a type of software application, display of a plurality of scan patterns;
   receiving, based on a selection of one or more scan patterns of the plurality of scan patterns, a binary file of the software application and scan pattern information, wherein the scan pattern information comprises the selected one or more scan patterns;
   identifying, based on the binary file, one or more executable files of the software application;
   determining, based on the scan pattern information and the one or more executable files, location information for one or more sensitive data elements configured with the software application; and
   determining, for each of the one or more sensitive data elements, based on the location information, a respective source of the sensitive data element.

* * * * *